July 26, 1927.
M. A. ROBIN
1,637,280
PUNCTUREPROOF CUSHION WHEEL
Filed May 15, 1926
2 Sheets-Sheet 1
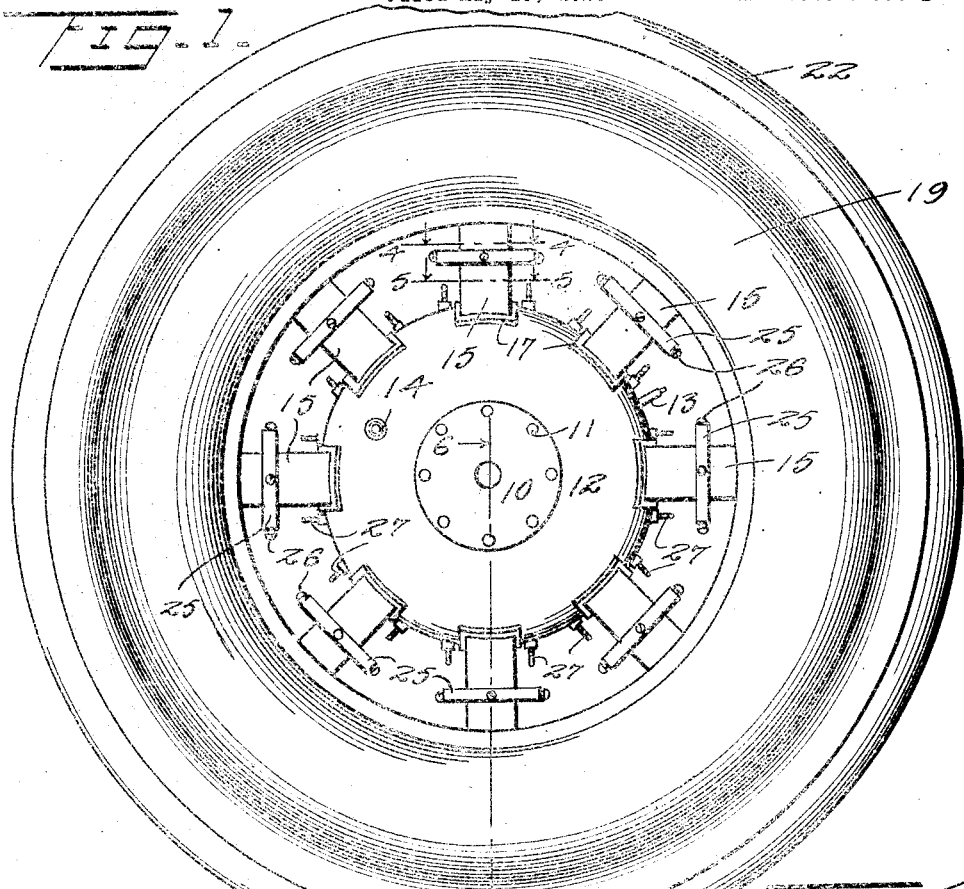
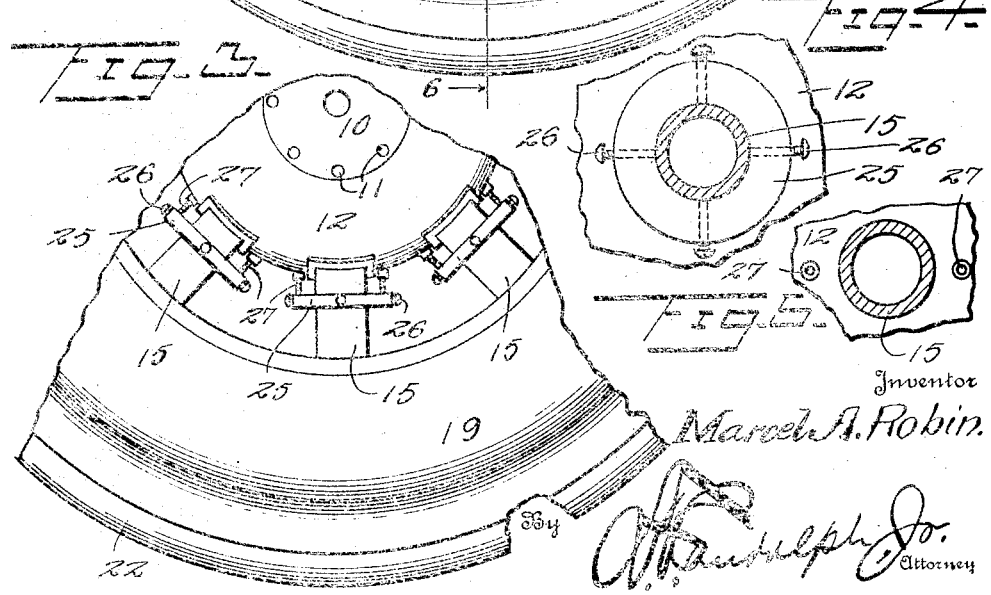

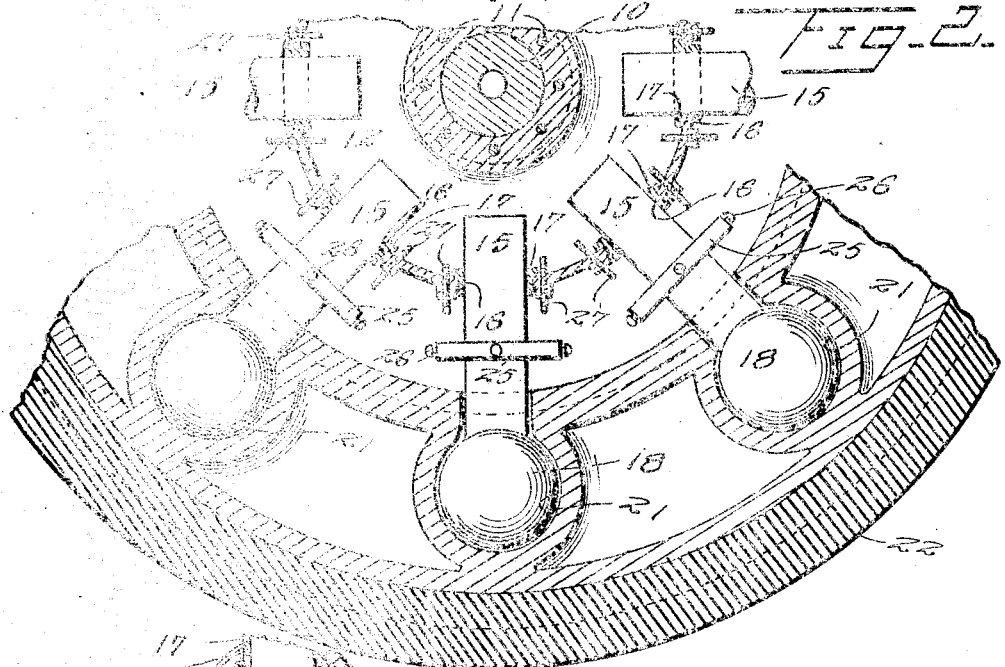
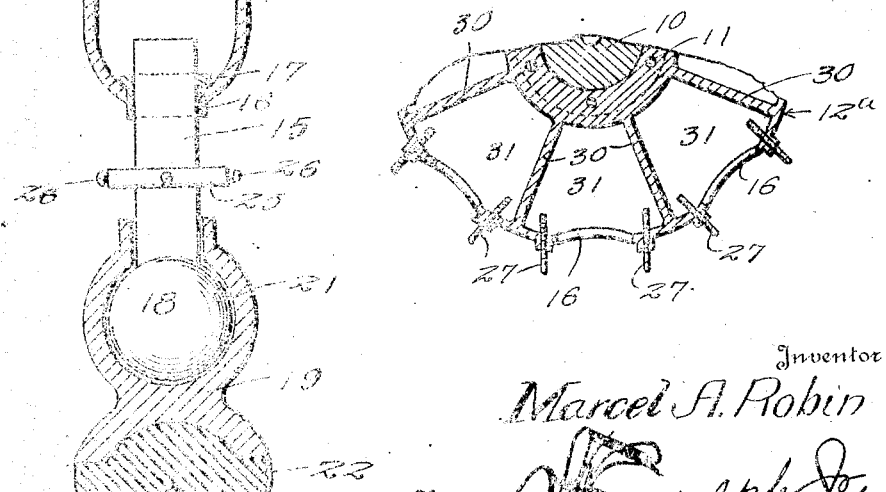
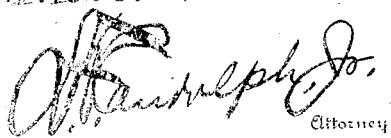

Patented July 26, 1927.

1,637,280

UNITED STATES PATENT OFFICE.

MARCEL A. ROBIN, OF PORT-AU-PRINCE, HAITI.

PUNCTUREPROOF CUSHION WHEEL.

Application filed May 15, 1926. Serial No. 109,333.

This invention relates to a wheel designed for use on vehicles generally and aims to provide one which will be free of danger from puncture and at the same time will be efficiently cushioned.

Another object is to provide a construction wherein the felly may move relatively to the wheel hub against a cushion of air retained by puncture-proof and unyielding means.

Another object is to provide a construction wherein in case of disability of the air cushion, the parts may be readjusted so that the wheel may function, although minus the cushioning feature, until repair can conveniently be made.

Various additional objects and advantages will be pointed out or become apparent from a consideration of the description following taken in connection with accompanying drawings illustrating an operative embodiment.

In said drawings:—

Figure 1 is a view in elevation illustrating the improved puncture-proof, cushion wheel in accordance with the present invention;

Figure 2 is a similar view but in substantially central vertical section;

Figure 3 is a fragmentary view similar to Figure 1 showing the parts adjusted as contemplated in case of failure of the air cushion;

Figure 4 is a cross sectional view taken on the line 4—4 of Figure 1;

Figure 5 is a detail cross sectional view taken on the line 5—5 of Figure 1;

Figure 6 is a radial sectional view through the wheel on the longitudinal median line of one of the pistons and on line 6—6 of Figure 1, and Figure 7 is a detail of a modified form wherein separate cushion chambers are provided for each spoke piston.

Referring specifically to the drawings, the wheel is equipped with a suitable hub 10 for connection to an axle, the particular type of hub being immaterial as will be obvious.

Fastened to the hub in any suitable manner as by bolts 11 is an endless reservoir 12 adapted to contain air at any desired pressure. This reservoir may be of any appropriate cross sectional area and size. Preferably it is made from a suitable stout metal, so that it will be practically free from danger of puncture. Air from any suitable source may be supplied to the reservoir 12 through a valve and nipple as at 13. The details of the nipple and valve 13 are immaterial but for instance may be similar to the standard types used on inner tubes of automobile and other tires. Also connected to the reservoir is a suitable air pressure gage 14, which will always show the pressure of the air within the reservoir. This gage is conventionally shown since its details are immaterial but it may be similar to automobile tire gages having the outer portion rigidly connected to the reservoir, with such portion open at its inner end and in communication with the interior of the reservoir so that the air may impinge against the piston of the gage.

Radiating from the reservoir are a suitable number of spokes or pistons 15, preferably of metal, and either solid or hollow as preferred. Such pistons 15 slide radially of the reservoir in openings 16 of the latter, but are disposed in hermetic engagement at said openings for instance through the provision of gaskets as at 17.

At the outer ends, the pistons 15 terminate in balls or spheres 18 by means of which connection is made to a felly 19. This felly 19 may be of any appropriate form and the balls 18 are loosely connected therewith in sockets 21 so that the parts may have the proper relative movement. It will be noted that normally the felly is spaced from the reservoir so that the parts may properly move to attain the cushioning of the felly.

In a wheel of this character, a pneumatic tire or other tire for cushioning purposes is unnecessary but I prefer to use a rubber or equivalent bead or band 22 about the periphery of the felly in order that the wheel may move noiselessly in practice.

The inward movement of the plunger spokes 15 may be limited through the engagement of collars 25 adjustably connected to the spokes as by binding screws 26, with abutments 27 on the reservoir, the latter being for instance bolts capable of adjustment toward or from the wheel hub.

In operation, the felly in traveling over the road, will move according to the unevenness of the road surface and obstructions, toward the hub or axis of the wheel. Such movement will be cushioned by the compressed air within the reservoir 12 since the inner ends of the pistons 15 impinge against such air. As a result, a construction is provided having no part subject to puncture and one which is at the same time durable and comparatively inexpensive.

The parts of course may be lubricated in any desired manner, most of them being exposed so as to be accessible to an ordinary oil can, but if desired, any other means or system of lubrication may be followed.

As shown in Figure 3, should the air cushion become defective, the collars 25 may be moved inwardly into engagement with the abutments 27 and then refastened rigidly to the pistons, so that relative movement between the felly and the hub can not occur although of course the wheel when thus used in case of an emergency, will be minus the cushion feature.

As suggested in Figure 7, the reservoir 12$^a$ may be subdivided by partitions 30 to provide a plurality of separate air reservoirs 31 into which the pistons 15 extend. Each of these reservoirs 31 may be equipped with one of the devices 13 for the supply of air and one of the gages 14.

As to the supply of air for the improved wheel, the same may be readily derived from a pump which may form an attachment for and be driven by the engine or motor of an automobile, in the same manner that some automobile tire pumps are now driven.

Various changes may be resorted to provided they fall within the spirit and scope of the invention.

It will be furthermore understood that while collars 25 are primarily to be used only in event the air cushion becomes defective, they may also be used to limit the movement of the spokes relatively to the reservoir 12.

I claim as my invention:—

1. A wheel of the character described comprising a felly, spokes mounting the felly, means providing an air cushion for the spokes, and means whereby the spokes may be fastened immovably with respect to the axis of the wheel, comprising a collar adjustable on each spoke and engageable with said air cushion means.

2. A wheel of the character described comprising a nondeformable air reservoir, pistons coacting therewith, means forming hermetic joints between the pistons and the reservoir, a felly carried by the pistons, abutment means on the reservoir, and a collar adjustable on each piston relatively to the abutment means for the purpose set forth.

3. A wheel of the character described comprising a nondeformable air reservoir, pistons coacting therewith, means forming hermetic joints between the pistons and the reservoir, a felly carried by the pistons, abutment means on the reservoir, and a collar adjustable on each piston relatively to the abutment means for the purpose set forth, and the pistons at their outer ends having balls loosely connected to the felly.

In testimony whereof I affix my signature.

MARCEL A. ROBIN.